June 6, 1950 F. SHORT 2,510,145
OPTICAL INSTRUMENT FOR VISUALLY COMPARING A SURFACE WITH
A SELECTED ONE OF A PLURALITY OF STANDARD SURFACES
Filed Nov. 13, 1946 3 Sheets-Sheet 3
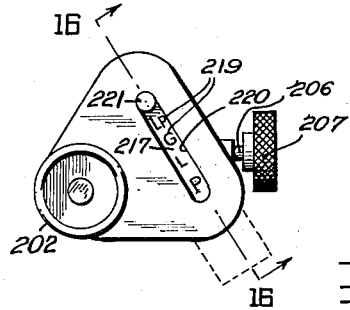
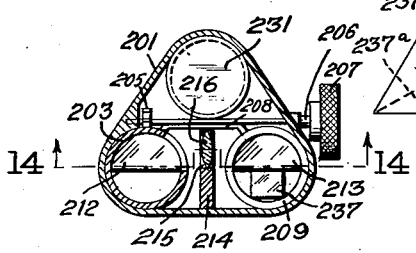
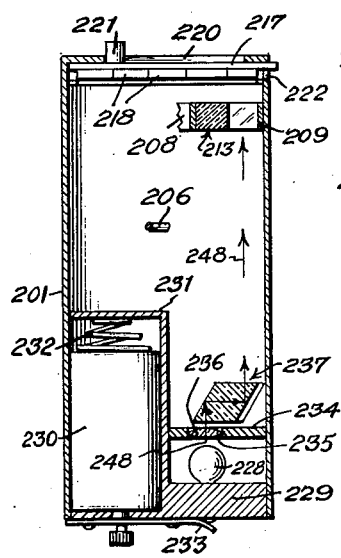
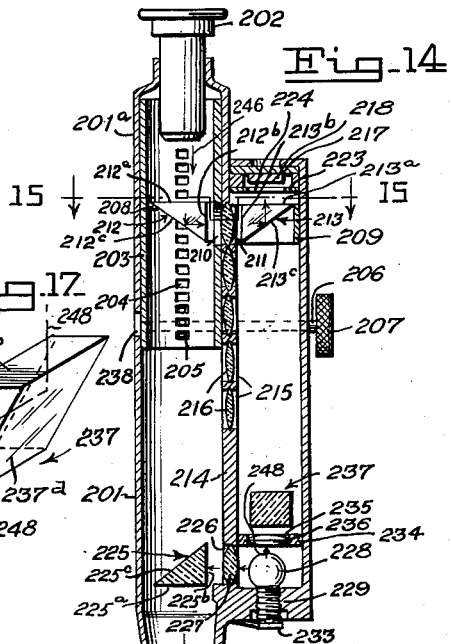
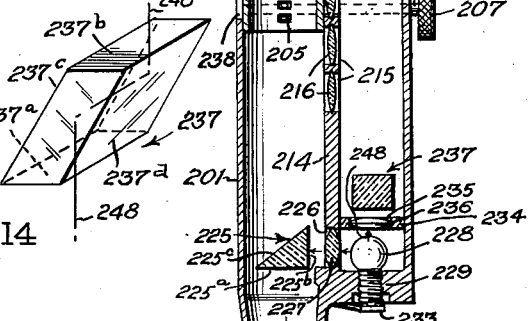
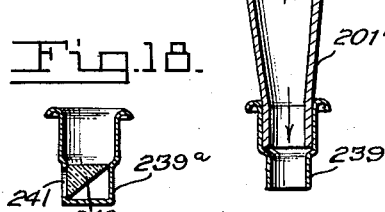
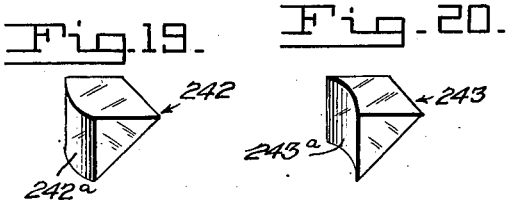
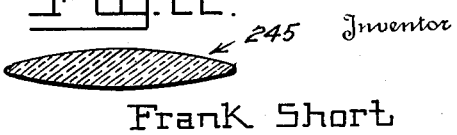
Inventor
Frank Short
By G. J. Kessenich, J. H. Church + H. E. Thibodeau
Attorney

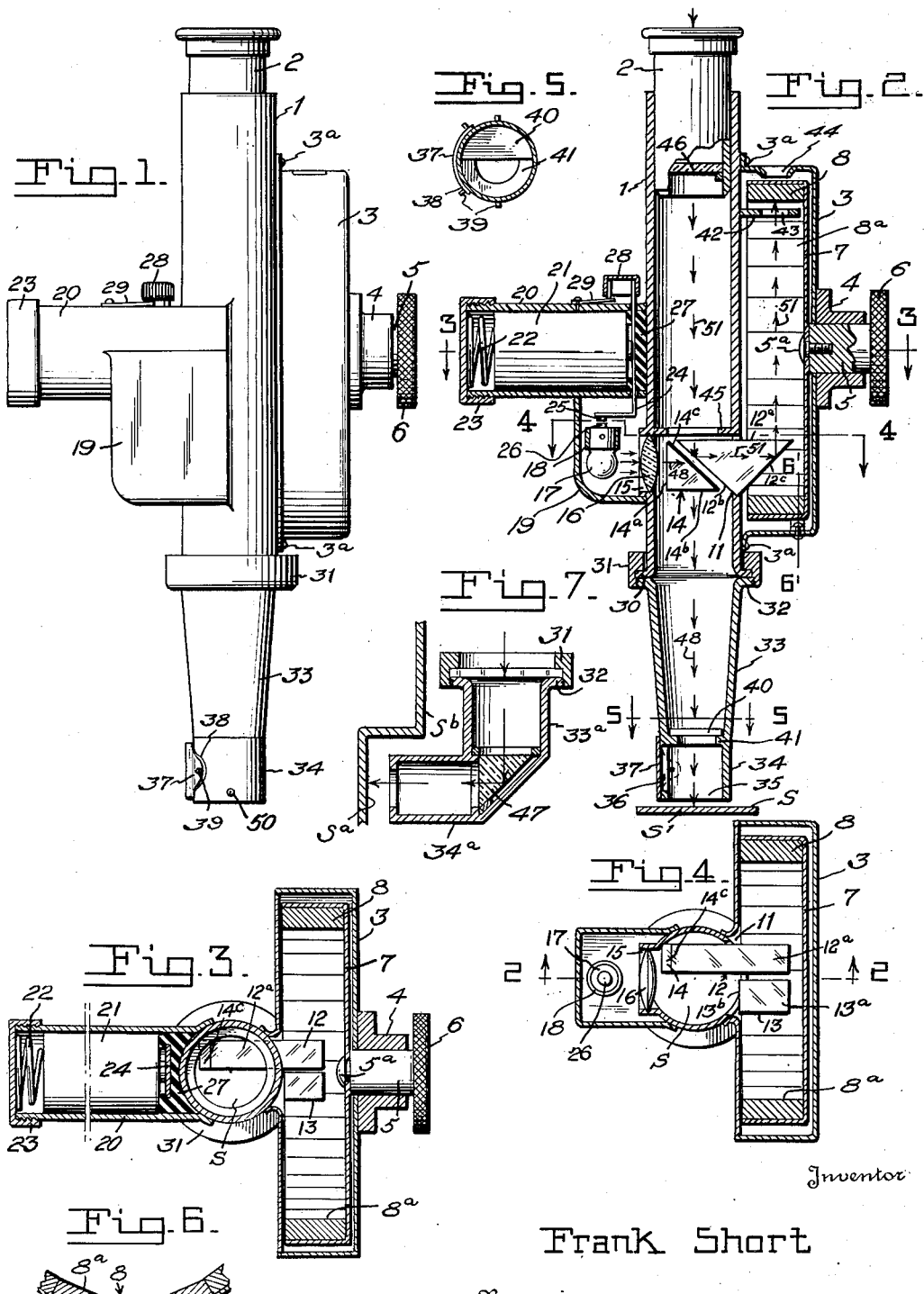

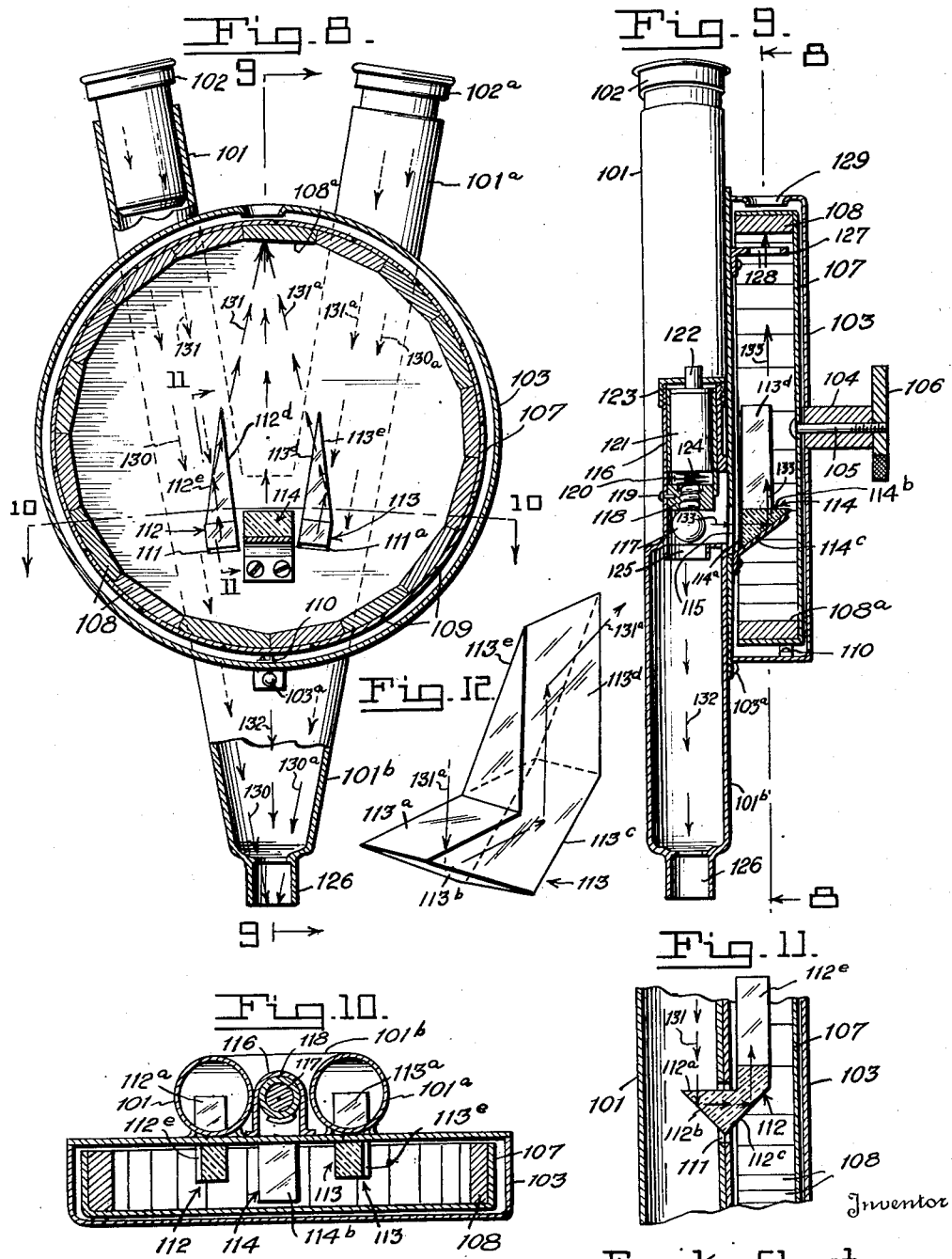

Patented June 6, 1950

2,510,145

UNITED STATES PATENT OFFICE 2,510,145

OPTICAL INSTRUMENT FOR VISUALLY COMPARING A SURFACE WITH A SELECTED ONE OF A PLURALITY OF STANDARD SURFACES

Frank Short, Canton Center, Conn.

Application November 13, 1946, Serial No. 709,632

2 Claims. (Cl. 88—14)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a new and useful improvement in comparators and is more particularly designed to provide an instrument for comparing specimens of surface finish with surface finish standards, in which by means of a convenient arrangement of a plurality of standards and a novel optical system images of the selected proper standard and the surface being compared appear juxtaposed and adequately illumined for observation. The particularly novel and useful features of my improved device are the means which I provide for housing within the instrument a removable magazine charged with a plurality of plates, each of which is provided with a surface to be observed, the means for adjustably mounting the plates so that any selected one thereof may be moved into position for viewing in apparently side-by-side relation with a specimen surface, the means for producing the images of the surfaces of the specimen and selected standard in apparent juxtaposition, and the means for simultaneously illumining the surface and the standard.

My improved device, in a number of forms which are hereinafter fully described, is a portable instrument affording means to observe finished surfaces "in situ," the requisite number of standards being transported thereby, and made readily available for comparisons with observed specimens by the functioning of my improved device. The device is quite compact as its dimensions are reduced by the economical disposition of its operative elements. The chief contribution to this desirable result is the novel relation of the ocular, standard magazine and observed surface. When in use, one end of the device is contiguous to the observed surface, and the ocular is at the opposite end, observation being made in an unobstructed path of vision through a viewing tube co-extensive with the device. The selected standard is disposed in the end of the device in which the ocular is disposed. By a novel optical system, the selected standard is observed through a path of vision, having two portions within and without the viewing tube, respectively, said path extending from the ocular within the tube, and, reversing its direction extending to the standard without the tube. The sum of the two portions is substantially equal to the length of the path of vision to the specimen, effecting the apparent disposition of the image of the standard equi-distant with the specimen from the ocular, to facilitate their comparison.

While I have illustrated in the drawings, and have hereinafter fully described several specific embodiments of my invention, it is to be distinctly understood that I do not consider my invention to be limited to said specific embodiment, but refer for its scope to the claims appended hereto.

In the drawings:

Fig. 1 is a side elevation of the device.

Fig. 2 is a vertical section on the line 2—2 of Fig. 4, in the direction of the arrows.

Fig. 3 is a horizontal section on the line 3—3 of Fig. 2, in the direction of the arrows.

Fig. 4 is a horizontal section on the line 4—4 of Fig. 2, in the direction of the arrows.

Fig. 5 is a horizontal section on the line 5—5 of Fig. 2, in the direction of the arrows.

Fig. 6 is a vertical section on the line 6—6 of Fig. 2.

Fig. 7 is a vertical section of an auxiliary viewing tube for use in connection with the form shown in Figs. 1 to 6.

Fig. 8 is a vertical section, parts broken away, of a modified form of the invention, taken on the line 8—8 of Fig. 9, in the direction of the arrows.

Fig. 9 is a vertical section, parts broken away, on the line 9—9 of Fig. 8, in the direction of the arrows.

Fig. 10 is a horizontal section on the line 10—10 of Fig. 8, in the direction of the arrows.

Fig. 11 is a fragmentary vertical section on the line 11—11 of Fig. 8, in the direction of the arrows.

Fig. 12 is an enlarged perspective of one of the triple prisms used in the viewing tubes.

Fig. 13 is a top plan view of another modified form of the device.

Fig. 14 is a vertical section on the line 14—14 of Fig. 15, in the direction of the arrows.

Fig. 15 is a sectional view taken upon a plane indicated by the line 15—15, Fig. 14, looking in the direction of the arrows.

Fig. 16 is a vertical section on the line 16—16 of Fig. 13, in the direction of the arrows.

Fig. 17 is an enlarged perspective of the double prism used in the illuminating means.

Fig. 18 is a vertical section of an auxiliary viewing tube.

Fig. 19 is an enlarged perspective of a convex cylindrical surfaced prism for the auxiliary tube.

Fig. 20 is an enlarged perspective of a concave cylindrical surfaced prism for the auxiliary tube.

Fig. 21 is an enlarged section of a concave cylindrical lens for the main viewing tube.

Fig. 22 is an enlarged section of a convex cylindrical lens for the main viewing tube.

As illustrated in the drawings, one form of my device (Figs. 1 to 7) has a cylindrical viewing tube 1 with an adjustable ocular 2. A circular housing or casing 3 is removably mounted on tube 1 by bolts 3-a and has a bearing 4 in which is journaled a shaft 5 provided with a knurled operating knob 6 exterior of housing 3. Within housing 3, the shaft 5 has removably mounted thereon by bolt 5-a a hollow drum 7 on the inner periphery of which there is disposed a plurality of plates 8 having plane faces 8-a normal to the diameters of the housing 3 passing through the faces 8-a, respectively. The drum 7 is provided on its outer periphery with a plurality of notches 9 (Figure 6) suitably disposed relative to the plates 8, respectively, with which cooperates a spring detent 10 mounted on the inner periphery of the housing 3. The tube 1 has an orifice 11 communicating with the interior of the housing 3. A double prism 12 is mounted on tube 1 so as to be disposed through orifice 11, its upper face 12-a being normal to the longitudinal axis of tube 1, and its angular faces 12-a, 12-c being symmetrically disposed in tube 1 and housing 3, respectively. The prism 12 has such a thickness that the portion thereof within tube 1 is confined to a semi-circular area of the tube 1 as will be noted by reference to Fig. 4. The prism 12 by reason of this thickness lies to one side of the horizontal diameter of orifice 11. Suitably mounted in the housing 3, there is a single triangular prism 13 having its horizontal face 13-a lying in the plane of face 12-a of prism 12, its vertical face 13-b lying in the plane passing through the apex of faces 12-b and 12-c of prism 12, and its third face lying in the plane of face 12-c of prism 12. It will be noted (Fig. 4) that prism 13 is so disposed as to lie adjacent prism 12, and be exposed by the remaining unobstructed one half of the horizontal diameter of the orifice 11. Suitably mounted in the tube 1, there is a single triangular prism 14 having its vertical face 14-a parallel to the longitudinal axis of tube 1, its face 14-b normal to said axis and its face 14-c parallel with face 12-b of prism 12. It will be noted (Fig. 4) that prism 14 lies entirely within the semi-circular area of the tube 1 in which prism 12 is disposed. The tube 1 is provided with an orifice 15 diametrically opposite to and of substantially the same size as orifice 11, in which is disposed a condensing lens 16 with which is associated an electric light bulb 17 carried in a suitable socket 18 in a light-proof housing 19 mounted on the tube 1. A housing 20 is mounted on tube 1 adjacent housing 19 and contains a suitable electric battery cell 21 having one end of its circuit connected to lamp 17 by spring 22, cap 23, housing 20, housing 19 and socket 18. The other end of the circuit of cell 21 is connected by slidable rod 24 to contact 25 co-acting with contact 26 of socket 18. Rod 24 slides through an insulated wall 27 in housing 20 and has an operating button 28 urged by spring 29 to maintain the circuit normally open. It will be noted (Fig. 4) that light rays from bulb 17 pass through lens 16 to both prisms 13 and 14.

Tube 1 is provided at its lower end with an exterior peripheral flange 30 on which is rotatably carried a collar 31 into which is threaded an exterior peripheral flange 32 on an inverted frusto-conical auxiliary tube 33 having a cylindrical bottom portion 34, provided with an axial orifice 35 and a lateral orifice 36. An arcuate shutter 37 having two circumferentially-spaced wings 38 whose apertures are received by correspondingly-spaced pins 39 the outer face of portion 34 is provided for masking orifice 36, as illustrated in Fig. 2. It is obvious that a plane shutter (not shown) can be supported by pins such as 50, to mask orifice 35. The shutter 37 is used to close orifice 36 when a horizontally disposed surface, such as S on specimen S—1 is to be viewed through tube 1 in vertical position.

As illustrated in Figs. 2 and 5, a mask 40 is suitably disposed on internal flange 41 at bottom of portion 33. The mask 40 is an opaque semi-circular diaphragm closing one half of the cross-sectional area of tube 33. As illustrated in Fig. 2, a mask 42 is suitably mounted in housing 3 between prisms 12 and 13 and that one of plates 8 which has been turned to viewing position. The mask 42 has a suitable orifice 43 to define the area of each plate 8 exposed to prisms 12 and 13. Housing 3 has a window 44 through which may be observed suitable indicia (not shown) on the outer periphery of drum 7 to identify the plates 8, respectively. A suitable diaphragm 45 may be provided in tube 1 above prism 12 to define the area of observation. A micrometric reticle 46 may be mounted in the ocular 2.

In Fig. 7, there is shown an auxiliary viewing tube having the cylindrical portion 33-a with cylindrical elbow 34-a between which is placed a single triangular prism 47. Such a viewing tube can be applied to tube 1 when it is desired to observe a vertical surface S-a under an overhang S-b. It is obvious that when tube 33 is used for observations through orifice 36, a prism such as prism 47 is used.

The form of the device illustrated in Figs. 8 to 12, for binocular observation, has two viewing tubes 101 and 101-a with adjustable oculars 102 and 102-a, respectively, disposed relatively at the proper pupillary distance. The tubes 101 and 101-a are suitably convergent, merging into a common portion 101-b. A circular housing 103 is removably mounted on tubes 101, 101-a and 101-b by bolts 103-a, and has a bearing 104 in which is journaled a shaft 105 provided with a removable, knurled, operating knob 106 exterior of housing 103. Within housing 103, the shaft 105 has mounted thereon a hollow drum 107 on the inner periphery of which there is disposed a plurality of plates 108 having plane faces 108-a normal to the diameters of the housing 103 passing through the faces 108-a, respectively. The drum 107 is provided on its outer periphery with a plurality of notches 109 suitably disposed relative to the plates 108, respectively, with which cooperates a spring detent 110 mounted on the inner periphery of the housing 103.

As shown in Fig. 11, a passage 111 is provided through the adjoining walls of tube 101 and housing 103, in which there is mounted a triple prism 112, extending into tube 101 and housing 103. The prism 112 has a face 112-a, on its portion in tube 101, which is normal to the longitudinal axis of tube 101, and angular faces 112-b and 112-c, in the tube 101 and housing 103, respectively, and relatively disposed at 90°. The prism 112 also has, on its portion in housing 103, a face 112-d normal to face 112-a and an angular face 112-e at an acute angle to face 112-d. A passage 111-a is provided, through the adjoining walls of tube 101-a and housing 103, in which there is mounted a triple prism 113 extending into tube 101-a and housing 103. The prism 113 (Fig. 12) has faces 113-a, 113-b, 113-c, 113-d and 113-e, corresponding to similar faces of prism 112. It will be noted (Fig. 8) that the prisms 112 and 113 are so related that their angular faces 112-e and 113-e are oppositely disposed.

Suitably mounted in housing 103, there is a single triangular prism 114 disposed between prisms 112 and 113. This prism 114 has its face 114-a parallel to the plane of the longitudinal axes of the tubes 101 and 101-a, its face 114-b normal to said plane and its angular face 114-c between the faces 114-a and 114-b. The prism 114 is so disposed that its face 114-a is exposed to a passage 115 from housing 103 to a housing 116 mounted between tubes 101 and 101-a on the upper end of portion 101-b. An electric light bulb 117 (Fig. 9) disposed co-axially with passage 115 is carried by socket 118 removably mounted in housing 116, by bolt 119, and connected by a coil spring 120 to the case of an electric battery cell 121 slidable in housing 116 and having on its upper end an operating button 122 slidable through an opening of screw cap 123 for the housing 116. One end of the circuit for bulb 117 is permanently connected to one side of cell 121 through socket 118, casing 116, cap 123 and button 122, and the other end intermittently connectible through contacts 124 on socket 118 and cell 121, held apart by spring 120 to hold the circuit from cell 121 to bulb 117 normally open. The housing 116 has a tube 125 co-axial with a reduced cylindrical tube 126 depending from portion 101-b. As shown in Fig. 9, a mask 127 is suitably mounted in housing 103, between prisms 112, 113, 114 and plates 108, with an orifice 128 to define the area of each plate 108 exposed to prisms 112, 113 and 114. Housing 103 has a window 129 through which may be observed suitable indicia (not shown) on the outer periphery of drum 107 to identify the plates 108, respectively.

The form of the device illustrated in Figs. 13 to 18, for monocular observation, has a tubular housing 201 having three sides connected by arcuate walls at the edges of the housing 201. The housing 201 has a cylindrical member 201-a extending from one end and a frusto-conical member 201-b from the other end, the members 201-a and 201-b being co-axial to provide a viewing tube with an adjustable ocular 202 in the upper end of member 201-a. Slidably mounted in this viewing tube there is a cylindrical sleeve 203 having a rack 204 meshing with pinion 205 on shaft 206 journaled in housing 201 and provided with a knurled operating knob 207 exterior of housing 201. The sleeve 203 is provided with a bracket 208 on which is mounted a sleeve 209 slidable in the housing 201 coincidentally with sleeve 203. Sleeves 203 and 209 have co-axial orifices 210 and 211, respectively. Suitably mounted in sleeve 203, there is a single triangular prism 212 having its upper face 212-a normal to the longitudinal axis of the viewing tube, its face 212-b parallel with said axis and exposed to orifice 210, and its angular face 212-c connecting faces 212-a and 212-b. Suitably mounted in sleeve 209, there is a single triangular prism 213 having its face 213-a lying in the plane of the face 212-a of prism 212, its face 213-b parallel to face 212-b of prism 212 and exposed to orifice 211, and its face 213-c connecting faces 213-a and 213-b. Suitably mounted in the housing 201, there is a partition 214 disposed between sleeves 203 and 209, and having a plurality of orifices 215 with which orifices 210 and 211 may be registered successively by sliding sleeves 203 and 209. A plurality of lenses 216 are carried by partition 214 in the orifices 215, respectively. The lenses 216 are double convex of uniform circumference, their focal lengths varying according to their distances from ocular 202. A slide 217 is removably mounted in the upper end of housing 201 and carries on its lower face a plurality of plates 218, and on its upper face a series of suitable indicia 219 to identify the plates 218, respectively, which indicia are observable through window 220 in the wall of housing 201. The slide 217 has a suitable removable operating button 221. The housing 201 has a slot 222 through which the slide 217 can be inserted into and removed from housing 201. A mask 223 is mounted in housing 201 adjacent slide 217, and has an orifice 224 to define the area of each plate 218 exposed to prism 213. Suitably mounted in the viewing tube contiguous to the lower end of partition 214, there is a single triangular prism 225 having its lower face 225-a normal to the longitudinal axis of the tube, its face 225-b parallel with said axis, and its angular face 225-c connecting faces 225-a and 225-b. The partition 214 has an orifice 226 in which it supports a concentrating lens 227. An electric light bulb 228 is mounted in a socket 229 in the bottom of housing 201. One end of the circuit of bulb 228 is permanently connected to an electric cell 230 through socket 229 housing 231 for cell 230 and coil spring 232 urging cell 230 against a properly insulated slide 233 for intermittent contact with the other end of the bulb circuit.

A partition 234 is disposed in housing 201 normal to partition 214 and having an orifice 235 in which it carries a concentrating lens 236. It will be noted (Fig. 14) that the bulb 228 is disposed at the intersection of the common horizontal axis of prism 225 and lens 227 and the vertical axis of lens 236. A double prism 237 is mounted in housing 201 adjacent lens 236 and has its lower face 237-a and its upper face 237-b in horizontal planes, and its angular parallelly disposed faces 237-c and 237-d connecting faces 237-a and 237-b.

It will be noted (Fig. 15) that prisms 212 and 213 are disposed entirely within one half of the cross-sectional area of the sleeves 203 and 209, respectively. The prism 225 is disposed directly below prism 212 to provide an unobstructed view through the viewing tube. The lower face 237-a of prism 237 is disposed directly below prism 213 and the upper face 237-b of prism 237 is displaced to lie outside of the area below prism 213.

The housing 201 has a peep-hole 238 through which may be observed suitable indicia (not shown) on sleeve 209 to indicate the registration of orifice 210 and 211 with lenses 216, respectively.

The member 201-b may be provided with a removable end sleeve 239 to define the area observable. A sleeve 239-a (Fig. 18) may be used in which a single triangular prism 240 affords observation angularly through window 241.

A single triangular prism 242, having a convex cylindrical face 242-a (Fig. 19) can be used in the auxiliary viewing tube of Fig. 7 in place of prism 47, or in sleeve 239-a of Fig. 18 in place of prism 240, should the observed surface be concave, in order to cause it to appear plane for ease of comparison with the plane surfaced standard. A single triangular prism 243 having a concave cylindrical face 243-a (Fig. 20) may be used likewise, should the observed surface be convex. A double concave lens 244 (Fig. 21) or a double convex lens 245 (Fig. 22) will serve the same purpose in portion 34, tube 126 and sleeve 239, in the several forms of the device, respectively.

I will now describe the use and operation of the several forms of my improved device which are illustrated in the drawings and which have been hereinbefore fully described. In the form of the device illustrated in Figs. 1 to 7 for monocular observation, the eye of the user, applied to ocular 2, can observe the surface S of specimen S-1

(Fig. 2) through the unobstructed half of the tube 1 (Figs. 3, 4), and simultaneously the standard surface 8-a of the proper plate 8, by means of the double prism 12 as indicated by the arrows 51 (Figure 2). It is obvious that manipulation of knob 6 rotates drum 7 to bring the desired plate 8 into line of vision through prism 12. The indicia which can be observed through window 44 indicate the desired plate and its proper position for its observation, and spring 10 co-acting with notch 9 holds drum 7 in adjusted position. The user having adjusted drum 7, as desired, presses button 28 to cause light from bulb 17 to pass through prism 13 to illumine the surface 8-a as indicated by arrows 51 and through prism 14 to illumine surface S as indicated by arrows 48. Casing 20 serves as a convenient handle for the device. From the foregoing description of the operation of this form of the device, it will be understood that the image of the standard surface 8-a and the actual surface S appear juxtaposed for ready comparison.

In the form of the device illustrated in Figs. 8 to 12, for binocular observation, the two eyes of the user, applied to oculars 102 and 102-a, respectively, can observe a surface of a specimen, placed below the open end of tube 126, through the unobstructed halves of tubes 101 and 101-a, as indicated by arrows 130 and 130-a, respectively, and simultaneously the standard surface 108-a of the proper plate 108 by means of the triple prisms 112 and 113, as indicated by arrows 131 and 131-a, respectively. The proper plate 108 is positioned to be observed, in the same way as in the first form of the device. When the desired plate 108 has been adjusted as indicated by its indicator viewed through window 129, the user presses button 122 to cause light from bulb 117 to pass through tubes 125 and 126 to illumine the observed specimen as indicated by arrows 132, and through prism 114 to illumine the adjusted plate 108, as indicated by the arrows 133. Thus the image of the standard surface 108-a and the actual surface below tube 126 appear juxtaposed through tubes 101 and 101-a to both eyes of the user.

In the form of the device illustrated in Figs. 13 to 18, for monocular observation, the eye of the user, applied to ocular 202, can observe a surface of a specimen placed below the open end of the sleeve 239, through the unobstructed half of the viewing tube formed by members 201-a and 201-b with housing 201, and simultaneously the standard surface of the proper plate 218 by means of the prisms 212 and 213 and the proper lens 216 therebetween, as indicated by arrows 246. The proper plate 218 is positioned to be observed by moving slide 219 by means of its button 221, its indicator 219 being observed through window 220. In order to produce the proper image of the surface of the proper plate 218, the conjoined sleeves 203 and 209 are adjusted by means of knob 207 to align prisms 212 and 213 with the proper lens 216. With the parts thus properly adjusted, the user moves slide 233 to cause light from bulb 228 to pass through lens 227 and prism 225 to illumine the observed specimen, as indicated by arrows 247, and to pass through lens 236 and prism 237 to illumine the observed plate 218 as indicated by the arrows 248. Thus the proper image of the surface of the proper plate 218 and the actual surface of the specimen appear juxtaposed, through the viewing tube.

Since lenses 216 have focal lengths varying in accordance with their disposition relative to ocular 202, respectively, it is possible to produce a plurality of selected images of the surface of each plate 218, by adjustment of prisms 212 and 213, as above described, thus greatly reducing the number of plates required to provide the desired number of images.

Having described my invention, what I claim is:

1. In a comparator, the combination of a viewing tube having an ocular at one end, an orifice at the other end through which a surface can be observed, and a lateral opening intermediate its ends; a casing removably mounted on said tube, and having an opening registering with said tube opening; a circular drum removably and rotatably mounted in said casing, and provided with means for its rotation, said means being exterior of said casing; a plurality of plates mounted in said drum, each having a plane face normal to the diameter of the drum bisecting said face, each of said faces having a standard surface with which an observed surface is to be compared; and a prism disposed through both of said openings so that portions of said prism are disposed in said tube and said casing, respectively, the faces of said prism being formed and disposed to afford a path of vision from said ocular through said tube and casing to one of said standard surfaces when the plate having said surface has been selectively positioned by rotation of said drum, to produce an image of said surface, said image being observable through said tube in apparent juxtaposition to the observed surface.

2. In an optical instrument for visually comparing a specimen surface with a selected one of a plurality of standard surfaces, a viewing tube, a housing mounted on one side of said tube, a drum journaled in said housing for rotation on an axis substantially concurrent with and normal to the axis of said tube, means mounting a plurality of different standard surfaces in succession about the inner periphery of said drum, means operable exteriorly of said housing to rotate said drum to locate said surfaces, in succession, at a predetermined viewing position fixed with respect to said housing, a Porro prism positioned partly in said tube and partly in said housing with its hypotenuse surface facing upwardly and normal to the axis of said tube, that portion of said prism in said tube extending over substantially one-half the cross-sectional viewing area thereof, said prism acting to project into said area, an image of a selected one of said standard surfaces, whereby a specimen surface and an image of a standard surface may be simultaneously viewed in side-by-side juxtaposed relation in said tube.

FRANK SHORT.

REFERENCES CITED

The following references are of record in the file of this patent:

UNITED STATES PATENTS

| Number | Name | Date |
|---|---|---|
| 1,957,043 | Harlow | May 1, 1934 |
| 2,027,663 | Allyn | Jan. 14, 1936 |
| 2,034,096 | Hauser | Mar. 17, 1936 |
| 2,040,066 | Ursinus | May 5, 1936 |
| 2,184,750 | Meinhardt et al. | Dec. 26, 1939 |
| 2,286,430 | Minton et al. | Jan. 16, 1942 |
| 2,389,544 | Peck et al. | Nov. 20, 1945 |
| 2,423,370 | Butscher | July 1, 1947 |
| 2,470,176 | Lindgren et al. | May 17, 1949 |